(12) United States Patent
McClendon

(10) Patent No.: US 8,989,654 B2
(45) Date of Patent: Mar. 24, 2015

(54) SYSTEM AND METHOD FOR PROVIDING OPTIONS WHEN A DISPATCH DESTINATION IS NOT AVAILABLE

(75) Inventor: Ginger McClendon, Herndon, VA (US)

(73) Assignee: Nextel Communications, Inc., Reston, VA (US)

( * ) Notice: Subject to any disclaimer, the term of this patent is extended or adjusted under 35 U.S.C. 154(b) by 1902 days.

(21) Appl. No.: 11/177,565

(22) Filed: Jul. 8, 2005

(65) Prior Publication Data
US 2006/0063486 A1 Mar. 23, 2006

Related U.S. Application Data

(60) Provisional application No. 60/610,560, filed on Sep. 17, 2004.

(51) Int. Cl.
*H04B 7/14* (2006.01)
*H04M 3/51* (2006.01)
*H04L 12/58* (2006.01)
*H04M 3/42* (2006.01)
*H04W 4/16* (2009.01)
*H04W 4/12* (2009.01)
*H04W 72/00* (2009.01)
*H04W 76/00* (2009.01)

(52) U.S. Cl.
CPC .......... *H04M 3/5116* (2013.01); *H04L 51/066* (2013.01); *H04M 3/42221* (2013.01); *H04W 4/16* (2013.01); *H04M 2201/40* (2013.01); *H04M 2201/60* (2013.01); *H04W 4/12* (2013.01); *H04W 72/005* (2013.01); *H04W 76/002* (2013.01)
USPC .......................................................... 455/15

(58) Field of Classification Search
CPC ................................. H04W 4/10; H04W 88/08
USPC .......................................................... 455/413
See application file for complete search history.

(56) References Cited

U.S. PATENT DOCUMENTS

2005/0250476 A1* 11/2005 Worger et al. .............. 455/412.1
2006/0003745 A1* 1/2006 Gogic ........................... 455/413

\* cited by examiner

*Primary Examiner* — Ankur Jain

(57) ABSTRACT

A method and system for providing an originating dispatch user with delivery options when a destination dispatch user is not available are provided. These options can include delivering buffered voice to a voice mail system, and converting the buffered voice to text and sending the text as an electronic mail, a short message service (SMS) message, or an instant message. The speech can be buffered in either the network or in the originating communication device. The speech can be buffered either before or after receiving a call setup acknowledgment from the dispatch network.

30 Claims, 4 Drawing Sheets

SYSTEM AND METHOD FOR PROVIDING OPTIONS WHEN A DISPATCH DESTINATION IS NOT AVAILABLE

CROSS-REFERENCE TO RELATED APPLICATION

This application claims the benefit of U.S. Provisional Patent Application Ser. No. 60/610,560, filed on Sep. 17, 2004.

FIELD OF THE INVENTION

This invention relates generally to the field of telecommunications, and in particular, to dispatch calling services.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a walkie-talkie type of call such as Nextel's service identified by the trade name Direct Connect.

One distinguishing characteristic of dispatch communications compared to interconnect communications is immediacy. Specifically, dispatch calls can be setup between a source and destination much quicker than interconnect calls. To that end, FIG. 1A illustrates an exemplary dispatch call setup method 100. In particular, the setup method 100 of FIG. 1A begins with mobile station A attempting to establish communication with mobile station B via dispatch network 105. Initially, mobile station A send a request 110 to the dispatch network 105, which is then forwarded by the dispatch network 105 to mobile station B as request 115. If mobile station B is powered on, it will send a response 120 to the dispatch network, which is in turn forwarded on to mobile station A as response 125. When mobile station A receives the response 125, it will provide an acknowledgement tone to the user indicating that the intended recipient has been reached and that the user may begin speaking. Accordingly, mobile station A will then forward the user's verbal communication (i.e., talk 130) to the dispatch network 105, which will in turn forward the communication (i.e., talk 135) to mobile station B. If, however, mobile station B is not available, the user of mobile station A will be provided with a negative acknowledgement tone. The user of mobile station A will then have to retry the call to mobile station B at a later time. Moreover, this is often a frustrating exercise since the negative acknowledgement tone may not come until some time after the initial communication request 110 was made.

FIG. 1B illustrates another exemplary dispatch call setup method 140. In this method, mobile station A provides an acknowledgement tone to its user before receiving a response from mobile station B. That is, once the initial request 145 is forwarded to mobile station B by the dispatch network as request 150, the user of mobile station A may begin speaking. Mobile station A will forward the user's verbal communication (i.e., talk 155) to the dispatch network 105 before an acknowledgement from mobile station B has been received. If mobile station B is available, it will provide response 160, which will in turn be forwarded to mobile station A as response 165. In this case, dispatch network will also forward the communication (i.e., talk 155) to mobile station B as talk 170. If, on the other hand, mobile station B is not actually available, the user of mobile station A will receive a negative acknowledgement (i.e., response 165) after the user has already begun speaking. As with the method previously described above with reference to FIG. 1A, this can be a frustrating experience for the user since they may be cut off mid-sentence by the negative acknowledgement, and since they had already expected their communication would be delivered.

Therefore, it would be desirable to provide an improved system and method for providing delivery options when a dispatch destination is not available.

SUMMARY OF THE INVENTION

Systems and methods for providing delivery options when a dispatch destination is not available are disclosed. In one embodiment, a method comprising sending a dispatch call request from an originating communication device to a dispatch network, buffering speech received by the originating communication device, and providing delivery options for the buffered speech when a destination communication device is unavailable.

Other embodiments are disclosed and claimed herein.

DETAILED DESCRIPTION OF THE EXEMPLARY EMBODIMENTS

One aspect of the invention is to provide an originating dispatch user with delivery options when a destination dispatch user is not available. In one embodiment, these options may include delivering buffered voice to a voice mail system. In another embodiment, these options may further include converting the buffered voice to text and sending the text as an electronic mail, a short message service (SMS) message, or an instant message (IM). In the case of buffered speech, such speech may be buffered by one or more components of the dispatch network or, alternatively, by the originating communication device. Moreover, it should be appreciated that the speech may be buffered either before or after receiving a call setup acknowledgment from the dispatch network.

Figure 2:
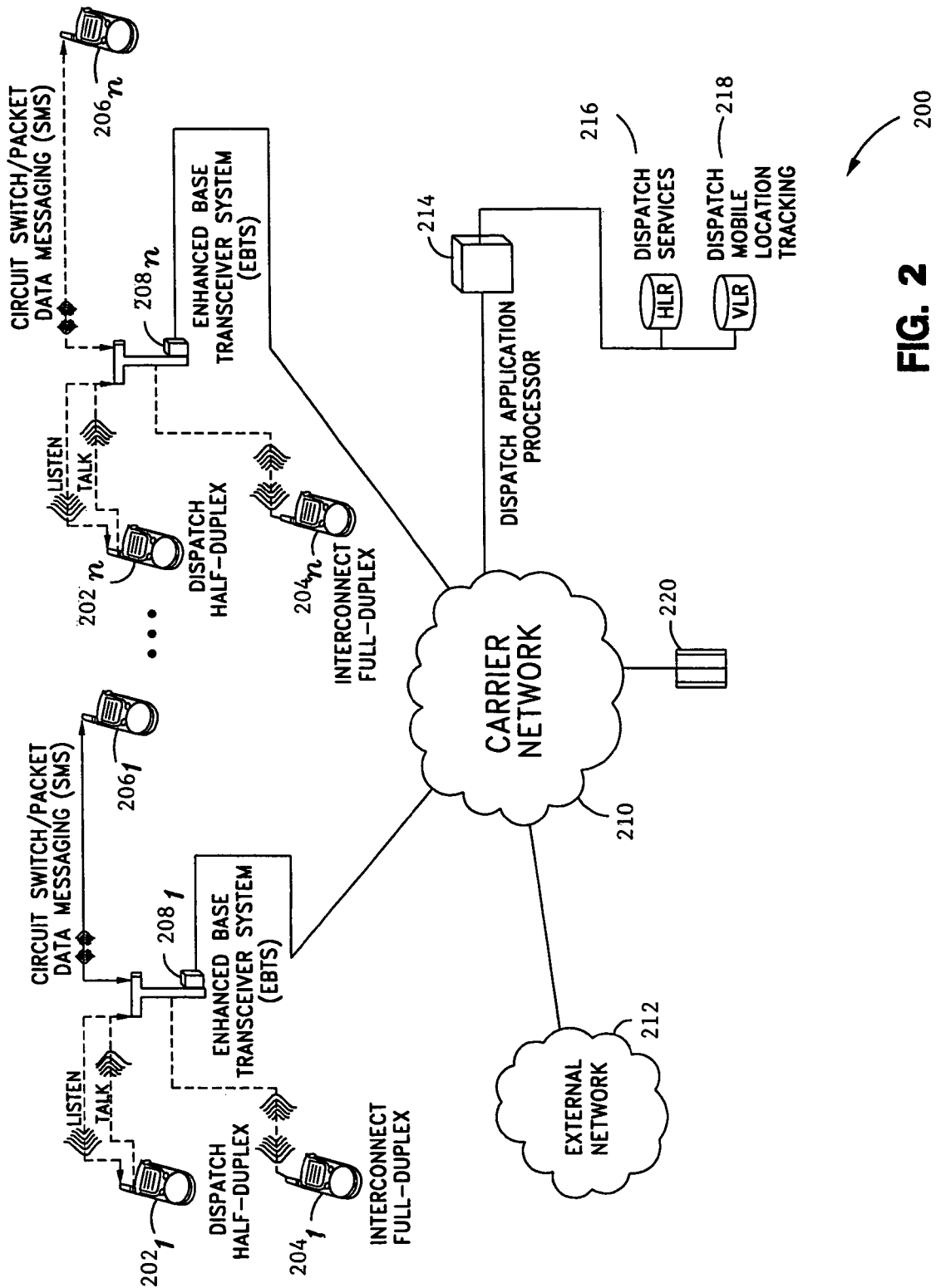
FIG. 2 depicts one embodiment of a system diagram of a communication system, on which one or more aspects of the invention may be implemented.

Referring now to FIG. 2, depicted is a simplified block diagram of an exemplary communication system 200 in which one or more aspects of the invention may be implemented. In one embodiment, the communication system 200 can be used by one dispatch subscriber unit to send a communication request to another dispatch subscriber unit over the carrier network 210. In one embodiment, the communication system 200 is an iDEN system, such as the iDEN network owned and operated by Nextel Communications Inc. of Reston, Va.

As shown in FIG. 2, the communication system 200 serves a plurality of dispatch subscriber units $202_1$-$202_n$, a plurality of interconnect subscriber units $204_1$-$204_n$, and a plurality of SMS subscriber units $206_1$-$206_n$ (collectively, "subscriber units 202-206"), all of which may communicate with a plurality of local base stations $208_1$-$208_n$. In the case of dispatch subscriber units $202_1$-$202_n$, base stations $208_1$-$208_n$ may provide half-duplex voice service, thereby allowing users to communicate with each other (or with external entities) by way of half-duplex voice. In the case of interconnect subscriber units $204_1$-$204_n$, base stations $208_1$-$208_n$ may provide full-duplex voice service, thereby allowing users to communicate with each other (or with external entities) by way of full-duplex voice. And in the case of SMS subscriber units $206_1$-$206_n$, base stations $208_1$-$208_n$ may allow users to transmit circuit switch/packet data with each other (or with external entities). It should be appreciated that subscriber units 202-206 may be comprised of phones, pagers, modems, mobile transceivers, personal digital assistants, end-user base transceivers, or similar devices capable of communicating over the carrier network 210. Although illustrated separately in FIG. 2, any subscriber unit 202-206 may be capable of dispatch calling, interconnect calling, roaming, message mail and/or data communications.

As depicted in FIG. 2, communication system 200 further includes a Dispatch Application Processor (DAP) 214. In one embodiment, the DAP 214 may coordinate and control dispatch and packet data services. Moreover, the DAP 214 may provide first-time registration for all interconnect and dispatch subscribers, as well as maintenance and tracking of subscriber mobility for dispatch and packet data. The Dispatch Home Location Register (D-HLR) 216 is a database that stores information about dispatch access rights and features allocated to each subscriber unit 202-206. The DAP-Visited Location Register (D-VLR) is a Random Access Memory (RAM) resident database that contains the most recent location information on each subscriber unit 202-206. As a subscriber unit 202-206 moves out of an area, it will report its new location to the DAP, which in turn may update the D-VLR 218. In one embodiment, the D-VLR 218 may contain the identification data for the subscriber unit in question, as well as subscriber data and the current status of the subscriber unit. The communication system 200 may further include a mobile switching center (MSC) 220 to provide interconnect services—the details of which are beyond the scope of the present disclosure.

Figure 1A:
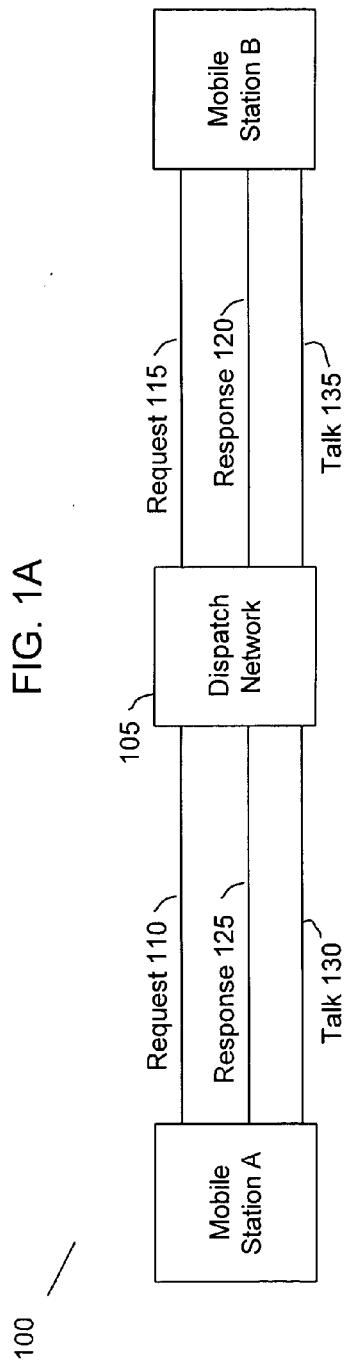
FIGS. 1A-1B depict typical dispatch call setup methods of the prior art.
Figure 3:
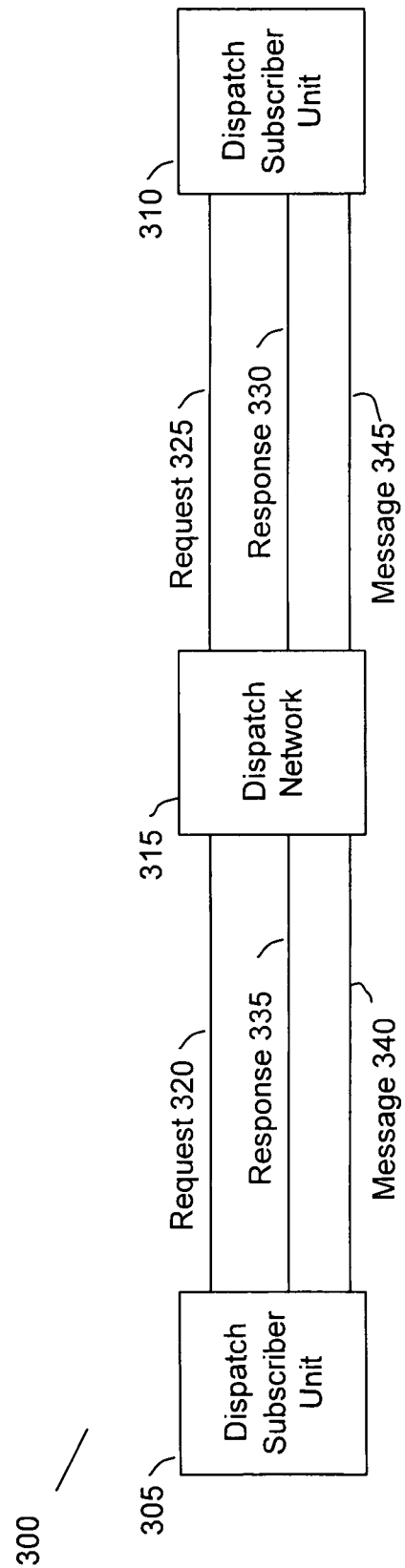
FIG. 3 depicts one embodiment of a dispatch call setup method in accordance with the principles of the invention.

FIG. 3 illustrates one embodiment of a signaling method in accordance with the principles of the invention. In this embodiment, originating dispatch subscriber unit 305 is attempting to contact target dispatch subscriber unit 310 via dispatch network 315. Moreover, dispatch network 315 employs a signaling method in which the initiating user does not speak until after an acknowledgement is received, such as the signaling method employed by the dispatch network of FIG. 1A. However, in the embodiment of FIG. 3, instead of, or in addition to, providing the originating dispatch subscriber unit 305 with a negative acknowledgement when target dispatch subscriber unit 310 is not available, the dispatch network 315 of FIG. 3 may provide the user of originating dispatch subscriber unit 305 with the ability to record a message and possibly choose from among a plurality of delivery options. Thus, unlike the typical case, in this embodiment a user will not begin talking until it has received either a positive acknowledgement from the dispatch network 315 that the target dispatch subscriber unit 310 is available, or, after receiving a message from the dispatch network indicating that the target dispatch subscriber 310 is not available, will be provided with the option to record a voice message for later delivery to the target dispatch subscriber unit 310.

Continuing to refer to FIG. 3, the signaling method 300 begins with originating dispatch subscriber unit 305 attempting to establish communication with target dispatch subscriber unit 310 via dispatch network 315. Initially, originating dispatch subscriber unit 305 will send a request 320 to the dispatch network 315, which is then forwarded by the dispatch network 315 to target dispatch subscriber unit 310 as request 325. If the target dispatch subscriber unit 310 is powered on, it will send a positive response 330 to the dispatch network 315, which is in turn forwarded on to the originating dispatch subscriber unit 305 as response 335, just as in the previously-described setup method of FIG. 1A.

If, however, the target dispatch subscriber unit 310 is not available, the dispatch network 315 will not receive a response 330 from the target dispatch subscriber unit 310, indicating that the target unit is not available. In this case, response 335 will be a negative acknowledgement signal which will be sent to the originating dispatch subscriber unit 305. However, in addition or instead of response 335, the originating dispatch subscriber unit 305 also will be provided with a message from the dispatch network 315 indicating that a message may now be recorded for later transmission to the target dispatch subscriber unit 310. In particular, the user of originating dispatch subscriber unit 305 may be provided with one or more message delivery options, including delivering buffered voice to a voice mail system or converting the buffered voice to text and sending the text as an electronic mail, an SMS message, or an IM. While in one embodiment the user's voice message 340 may be buffered by one or more components of the dispatch network 315, in an alternate embodiment the voice data may be buffered by the originating dispatch subscriber unit 305 itself, depending on its capabilities. Moreover, the buffering may also begin in the originating dispatch subscriber unit 305, but if the amount of speech exceeds the size of the local buffer, the dispatch network 315 may then take over buffering the remaining speech. In any event, once the target dispatch subscriber unit 310 is available, message 340 may be delivered as message 345, in accordance with the user-defined delivery options. In another exemplary embodiment, the user of the originating dispatch subscriber unit 305 can receive an acknowledgement from the dispatch network 315 when the stored message (i.e., message 345) is received by the target dispatch subscriber unit 310. For example, a flag can be stored along with the message to notify the originating dispatch user upon delivery of the message to the destination dispatch user. This notification can provide the day and time of delivery.

In still further embodiments, it should be appreciated that the user of the target dispatch subscriber unit 310 may begin hearing a voice playback of the message 345 as soon as the device is powered on. Alternatively, a user of the target dispatch subscriber unit 310 may begin hearing a voice playback of the message 345 only after affirmatively selecting to receive messages.

Figure 1B:
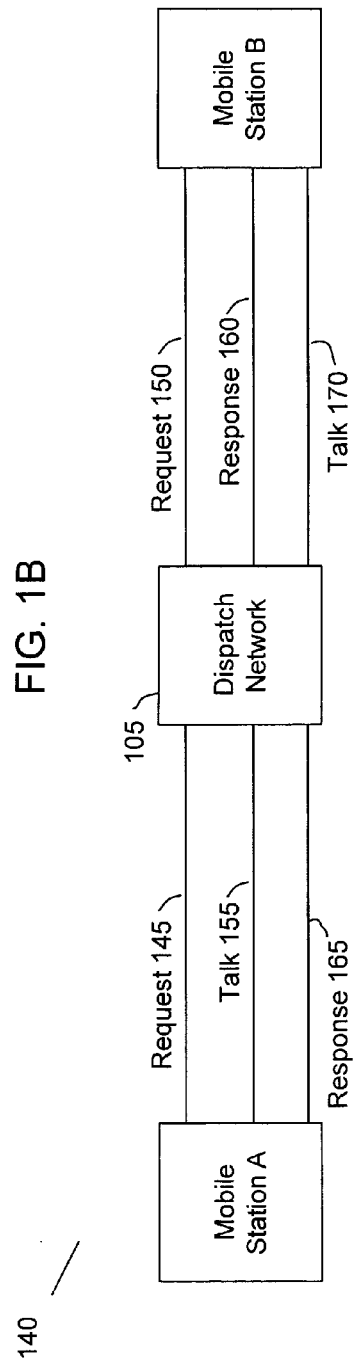
Figure 4:
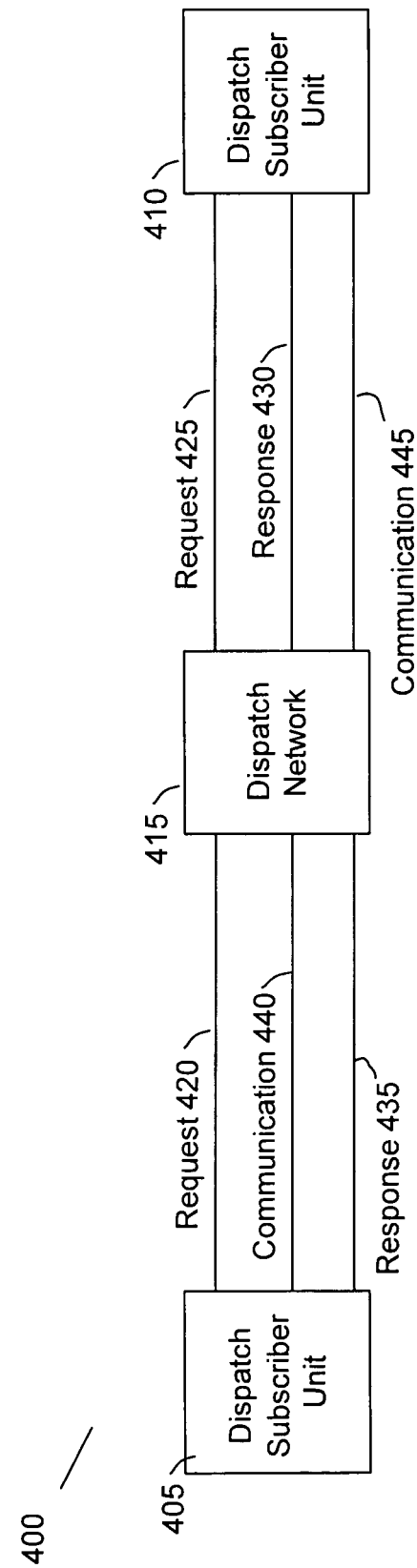
FIG. 4 depicts another embodiment of a dispatch call setup method in accordance with the principles of the invention.

Referring now to FIG. 4, depicted is another embodiment of a signaling method in accordance with the principles of the invention. As with the signaling method 300 of FIG. 3, the signaling method 400 of FIG. 4 involves an originating dispatch subscriber unit 405 attempting to contact a target dispatch subscriber unit 410 via dispatch network 415. The dispatch network 415 of FIG. 4 employs a signaling method in which the initiating user may begin speaking prior to receiving an acknowledgement from the destination dispatch device, such as the method employed by the dispatch network 105 of FIG. 1B. However, in the signaling method 400 of FIG. 4, instead of, or in addition to, providing the originating dispatch subscriber unit 405 with a negative acknowledgement when the target dispatch subscriber unit 410 is not available, the dispatch network 415 of FIG. 4 may provide the user of the originating dispatch subscriber unit 405 with the ability to record a message and then choose from among a plurality of delivery options for the recorded message. In one embodiment, the message to be delivered is comprised of the user's speech, which was provided after request 420 was issued but prior to receiving any response from the dispatch network 415 regarding the availability of the target dispatch subscriber unit 410.

The signaling method 400 of FIG. 4 begins with originating dispatch subscriber unit 405 attempting to establish communication with target dispatch subscriber unit 410 via dispatch network 415. Initially, originating dispatch subscriber unit 405 will send a request 420 to the dispatch network 415, which is then forwarded on to target dispatch subscriber unit 410 as request 425. However, rather than waiting for an acknowledgement (either positive or negative) from the target dispatch subscriber unit 410, this signaling method 400 permits the user of originating dispatch subscriber unit 405 to begin speaking without the typical delay, irrespective of whether the target dispatch subscriber unit 410 is available or not. This speech (i.e., communication 440) may then be buffered either at the mobile station (i.e., originating dispatch subscriber unit 405) or in the dispatch network 415 itself for later delivery to the target dispatch subscriber unit 410. Moreover, the location of buffering can be a configurable option depending upon the amount of memory of the mobile station. In addition, it should be appreciated that the buffering can begin in the mobile station, and if the amount of speech exceeds the size of the locally available buffer, the dispatch network 415 can take over buffering of the remaining speech.

If the target dispatch subscriber unit 410 is in fact available, then the response 430 would be delivered back to the dispatch network 415, which is then passed along as an affirmative response 435. Communication 440, which may have been buffered at the mobile unit and/or at the dispatch network 415, would be sent to the target dispatch subscriber unit 410 as communication 445. In one embodiment, the user experiences no delay or lag since speech was provided right away and without interruption.

If, on the other hand, the target dispatch subscriber unit 410 is not available (e.g., a negative response 430 is received by the dispatch network 415), then communication 440 may be buffered for later delivery. In addition, the user of the originating dispatch subscriber unit 405 may be provided with one or more message delivery options, including delivering buffered voice to a voice mail system, or converting the buffered voice to text and sending the text as an electronic mail, an SMS message, or an IM. In one embodiment, the user experiences no delay or lag since speech may be provided right away, and in the event that the target dispatch subscriber unit 410 is unavailable; such speech can be seamlessly converted into a message for later delivery in accordance with user-defined delivery options.

As with the signaling method 300 of FIG. 3, the user of the target dispatch subscriber unit 410 may begin hearing a voice playback of the communication 445 as soon as the device is powered on. Alternatively, user of the target dispatch subscriber unit 410 may begin hearing a voice playback of the message 445 only after affirmatively selecting to receive messages.

In accordance with exemplary embodiments of the present invention, the originating dispatch user can receive an acknowledgement when the stored message is received by the destination user. For example, a flag can be stored along with the message to notify the originating dispatch user upon delivery of the message to the destination dispatch user. This notification may also provide the day and time of delivery. Of course, any type of communicable information can be made available to the user upon receipt of the message by the target subscriber unit.

The present invention can also be applied to what are known as "follow me" services. "Follow me" services allow users to choose destinations when one of their communication devices is not available, or on demand. For example, a user may choose to have all dispatch calls forwarded to the user's desktop computer when the user is in the office. Similarly, the user can choose that when the user's mobile station does not respond to a call setup request, the call will be forwarded to another destination previously selected by the user. Accordingly, the message stored by the present invention can be sent to the destination device defined by the follow me services.

Moreover, in those previously-described embodiments in which the originating dispatch subscriber unit is to be provided with message delivery options, such delivery options may be based on information about the target's availability. That is, the network (e.g., dispatch network 315, dispatch network 415, etc.) may have access to certain availability information regarding the target (e.g., target is available via IM, SMS, email, voicemail, etc.). Where such target availability information is present, the previously-described delivery options provided back to the originating dispatch subscriber unit may include one or more preferred delivery options based on this target availability information.

Although the present invention has been discussed as mobile stations performing dispatch communications, the present invention is also applicable to other devices which perform dispatch communications. For example, desktop computers, dispatcher stations and the like can participate in dispatch communications, and hence, can be employed in connection with the present invention.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method for dispatch communication comprising:
    sending a first dispatch call request from an originating communication device to a dispatch network, wherein the first dispatch call request is configured to be forwarded by the dispatch network, as a second dispatch call request, to a destination communication device;
    buffering speech received by the originating communication device at least partially before receiving any response to the first dispatch call request regarding the availability of the destination communication device;
    receiving, after said buffering speech at least partially, a negative call setup acknowledgement, in response to the first dispatch call request, indicating that the destination communication device is currently unavailable; and
    providing delivery options for the buffered speech in an event that the destination communication device is unavailable.

2. The method of claim 1, wherein buffering speech comprises buffering speech using a memory of said originating communication device.

3. The method of claim 1, wherein buffering speech comprises buffering speech by one of said originating communication device, a dispatch network and a combination thereof.

4. The method of claim 1, wherein providing delivery options comprises providing delivery options for the buffered speech when a destination communication device is unavailable, wherein said delivery options include one or more of sending the buffered speech to a voice mail system and converting the speech to text.

5. The method of claim 4, further comprising delivering said text to the destination communication device as one of an electronic mail, a short message service (SMS) message, and an instant message.

6. The method of claim 1, further comprising:
receiving an indication once said destination communication device becomes available, and in response to said indication
sending said buffered speech to the destination communication device in accordance with said delivery options.

7. The method of claim 1, further comprising providing an acknowledgement to the originating communication device when the buffered speech has been received by the destination communication device.

8. The method of claim 1, wherein providing delivery options comprises providing one or more preferred delivery options based on availability information of said destination communication device.

9. The method of claim 1, further comprising providing the buffered speech in response to a positive acknowledgement.

10. The method of claim 1, further comprising:
receiving, after said buffering speech at least partially, a positive acknowledgement in response to the first dispatch call request when the destination communication device is currently available.

11. The method of claim 10, further comprising sending to the destination communication device, in response to the positive acknowledgment and without delay, a communication comprising buffered speech.

12. A method for making a dispatch call comprising:
sending a first dispatch call request from an originating dispatch device to a dispatch network, wherein the first dispatch call request is configured to be forwarded by the dispatch network, as a second dispatch call request, to a destination dispatch device;
buffering at least a portion of the dispatch call prior to receiving any response to the first dispatch call request regarding the availability of the destination dispatch device;
receiving, after said buffering at least the portion of the dispatch call, a negative call setup acknowledgement, in response to the first dispatch call request, indicating that the destination dispatch device is currently unavailable;
providing delivery options for the buffered at least portion of the dispatch call;
receiving an indication once said destination dispatch device becomes available; and
sending, in response to said indication, the buffered at least portion of the dispatch call to the destination dispatch device in accordance with said delivery options.

13. The method of claim 12, wherein providing delivery options occurs prior to buffering at least the portion of the dispatch call.

14. The method of claim 12, wherein providing delivery options occurs after buffering at least the portion of the dispatch call has begun.

15. The method of claim 12, wherein buffering at least the portion of the dispatch call is done by said originating dispatch device.

16. The method of claim 12, wherein buffering at least the portion of the dispatch call is done by one of said originating dispatch device, a dispatch network and a combination thereof.

17. The method of claim 12, wherein providing delivery options comprises providing delivery options for the buffered at least portion of the dispatch call, wherein said delivery options include one or more of sending buffered speech to a voice mail system and converting the speech to text.

18. The method of claim 17, further comprising delivering said text to the destination dispatch device as one of an electronic mail, a short message service (SMS) message, and an instant message.

19. The method of claim 12, further comprising providing an acknowledgement to the originating dispatch device when the buffered at least portion of the dispatched call has been received by the destination dispatch device.

20. The method of claim 12, wherein providing delivery options comprises providing one or more preferred delivery options based on availability information of said destination dispatch device.

21. An originating dispatch device comprising:
a network interface; and
a processor configured to:
send a first dispatch call request to a wireless communication network by way of said network interface, said first dispatch call request is configured to be forwarded by the wireless communication network, as a second dispatch call request, to a destination communication device;
buffer speech at least partially before receiving any response to the first dispatch call request regarding the availability of the destination communication device;
receive, after said buffering speech at least partially, a negative call setup acknowledgement, in response to the first dispatch call request, indicating that the destination communication device is currently unavailable; and
receive delivery options from said wireless communication network for delivery of buffered speech in response to a destination dispatch device not being available.

22. The originating dispatch device of claim 21, further comprising a local memory, said buffered speech comprises speech provided by a user of said originating dispatch device after a dispatch call request is sent which is stored in the local memory.

23. The originating dispatch device of claim 21, further comprising a local memory, said buffered speech comprises speech provided by a user of said originating dispatch device after a dispatch call request is sent which is stored in one of the local memory, a memory of said wireless communication network and a combination thereof.

24. The originating dispatch device of claim 21, wherein the delivery options include one or more of sending the buffered speech to a voice mail system and converting the speech to text.

25. The originating dispatch device of claim 24, wherein the wireless communication network is to deliver said text to the destination dispatch device as one of an electronic mail, a short message service (SMS) message, and an instant message.

26. The originating dispatch device of claim 21, wherein the processor is further configured to receive an acknowledgement from the wireless communication network when the buffered speech has been received by the destination dispatch device.

27. The originating dispatch device of claim 21, wherein said delivery options include one or more preferred delivery options based on availability information of said destination dispatch device.

28. The originating dispatch device of claim 21, wherein the buffered speech is provided in response to a positive acknowledgement.

29. The originating dispatch device of claim 21, wherein the processor is further configured to:
    receive, after said buffering speech at least partially, a positive acknowledgement in response to the first dispatch call request when the destination communication device is currently available.

30. The originating dispatch device of claim 29, wherein the processor is further configured to send to the destination communication device, in response to the positive acknowledgment and without delay, a communication comprising buffered speech.

* * * * *